United States Patent [19]
Dunstan

[11] Patent Number: 5,511,923
[45] Date of Patent: Apr. 30, 1996

[54] CONTAINER TERMINAL APPARATUS AND METHOD

[75] Inventor: Paul D. Dunstan, Bellevue, Wash.

[73] Assignee: The Robotic Container Handling Co., Bellevue, Wash.

[21] Appl. No.: 45,827

[22] Filed: Apr. 9, 1993

[51] Int. Cl.⁶ .................................................. B65G 63/00
[52] U.S. Cl. ............................... 414/139.9; 414/140.3; 414/141.3; 414/786
[58] Field of Search ..................... 414/139.9, 140.3, 414/140.4, 141.3, 141.4, 141.6, 141.7, 786

[56] References Cited

U.S. PATENT DOCUMENTS

| | | | |
|---|---|---|---|
| 3,543,952 | 12/1970 | Young | 414/140.3 |
| 3,543,953 | 12/1970 | Ponsen . | |
| 3,559,822 | 2/1971 | Lichtenford et al. | 414/140.3 |
| 3,700,128 | 10/1972 | Noble et al. . | |
| 3,807,582 | 4/1974 | Anderson | 414/140.3 X |
| 3,812,987 | 5/1974 | Watatani . | |
| 3,952,891 | 4/1976 | Terayama et al. | 414/139.9 X |

FOREIGN PATENT DOCUMENTS

| | | | |
|---|---|---|---|
| 2658130 | 7/1978 | Germany | 414/141.3 |
| 3421418A1 | 1/1986 | Germany | B65G 63/04 |

OTHER PUBLICATIONS

"Containerport" and Contmatic, Container Handling Machines and the Matsystem and Grail, Container Handling Stacking Systems, Robotic Container Handling Co.
Exhibit "A", p. 564, FIG. 9.3 and FIG. 9.4.
FIG. 9.5, Containerport tower and elevator operation, p. 565.
Exhibit "B" Fata European Group's Contmatic machine.
Paceco Speed–Tainer System, Licensed by Kaiser Engineers, 1971.
Exhibit "C" The Matson Navigation Company's Matsystem.
Exhibit "C", Port of Los Angeles, Matson Pioneers Computerized Container Handling in L.A., E. J. Muller, Pacific Shipper Staff, L–25.
Exhibit "C", Port of Los Angeles, Matson Pioneers Computerized Container Handling in L.A., E. J. Muller, Pacific Shipper Staff, L–77.
Exhibit "D" Sea Land's Grail System.
Exhibit "D" Computer Technology and Container Yard Controls, Feb./Mar. 1989/WWS by M. T. Bohlman, Director, Equipment Engineering, Sea–Lamd Services, Inc., p. 80.

(List continued on next page.)

*Primary Examiner*—Michael S. Huppert
*Assistant Examiner*—Janice L. Krizek
*Attorney, Agent, or Firm*—Seed & Berry

[57] ABSTRACT

A method and apparatus for ASRS handling of loaded and empty oceangoing containers. Containers are stored in a multi-level loaded container facility in upland and pier banks of spaced rows and columns in a grill-like arrangement with each container in a particular space spaced from all other containers, commonly referred to in ASRS systems, as rack storage. Empty containers are stored in a separate building remote from but accessible to, the stored loaded container facility and identical containers of the same ocean carrier are stacked one on top of the other directly in separate cells. Containers which are handled between upland banks of spaces and pier banks of spaces are moved between the pier and upland spaces by a number of computer automated internal bridge cranes. The upland and pier banks are provided with external fast transport balconies which enable a container to be moved rapidly lengthwise along the length of the loaded container facility to bypass the slower movements of internal bridge cranes and thus make a more rapid deployment of that container. Similarly, the empty containers can be moved along a fast transport empty container balcony high up on the facility for bypassing the slower movements of internal bridge cranes to, immediately prior to being loaded aboard ship, move from one location along the facility to another opposite the pier crane that will load it aboard a ship. Or, this process is reversed when empty containers are being discharged (unloaded) from ships.

15 Claims, 5 Drawing Sheets

OTHER PUBLICATIONS

Engineer's Notebook, WWS/Feb./Mar. 1986, p. 81.
Engineer's Notebook, Index to Advertisers, Feb./Mar. 1986/WWS, p. 82.
Exhibit "E" Trends in High–Throughput Container Handling, etc, Rijsenbrij et al., 19 pages.
Exhibit "F" Port Facilities: Requirements For A Systems Approach, etc, van Leeuwen et al., 17 pages.
Exhibit "B" Contmatic the automation in the container stockage, FATA European Group.

CONTAINER TERMINAL APPARATUS AND METHOD

TECHNICAL FIELD

The present invention relates generally to an ASRS (automated storage and retrieval system) high productivity container storage apparatus for storing and loading and unloading containers to or from ships, and to or from rail cars and trucks, all done simultaneously. More particularly the invention pertains to an ASRS system designed to replace a typical ocean terminal operation for discharging (unloading) and loading of ships, which also includes an intermodal container handling facility for moving containers to or from railcars and trucks. Oversized and hazardous cargo containers (usually less than 1%), are lowered beneath the pier cranes, to be stored on the ground.

Ocean carriers transmit the inbound and outbound load plans of their ships, to the container terminals, several hours before a vessel's arrival. The load plans show precisely where in or on the ship, specific containers are stowed, or are to be stowed. The system's computer uses this data to direct the operation of the system.

BACKGROUND OF THE INVENTION

In other automated multi-level container storage and loading and unloading systems, the containers are stored in individual vertical and horizontal container spaces. Generally there will be several pairs of multi-level banks of such spaces with the space between the banks being served by cranes which can remove a container from any of the spaces in one bank and deliver that container to any of the spaces up, down, or laterally in either bank. Furthermore, in some of these automated container storage systems there are receiving and delivering cranes for delivering containers to and from land vehicles, such as trucks and rail cars. On the pier or water side of the storage facility, there are generally a plurality of pier cranes which deliver loaded and empty containers to and from sea-going vessels, and to or from AGVs (automated guided vehicles), automated, self-powered railcars, or truck-chassis. An important advantage of these systems is that they use much less land than conventional terminal operations. Thus ports can put land to much higher uses than as parking lots for containers. The other systems have not provided a means to have containers moved rapidly from one section of the systems to another, bypassing the slower movement of containers within said systems, nor have they provided for separate but integrated storage of empty containers that can be built and operated for a fraction of the cost of individual storage spaces. Empty containers remain in storage for much longer periods of time than do loaded containers. The lack of these features may explain why none of the other systems have been built.

A typical container ship can generate millions of dollars of revenue on a single transoceanic voyage. As a result, it is important for the ships to be discharged (off-loaded) and loaded in the minimum period of time so that they can be generating the maximum revenue by increasing the number of transoceanic voyages that can be made during a year. Furthermore, whenever a container vessel is laying alongside the pier, it must pay wages for its idle shipboard crew, berthing charges and other overhead expenses. Thus, it is of paramount importance to the ship owner or operator to minimize the loading and unloading time at a port facility. There is a great need for a system that can also significantly reduce the cost of handling containers on the terminal, thus increasing profits for ocean carriers.

SUMMARY OF THE INVENTION

Accordingly, it is a primary object of the present invention to provide a more highly efficient container handling and storage system for minimizing the time and cost to move a container through the system.

It is a further object of the invention to provide additional cost savings with a unique way of storing empty containers, apart from the much more expensive loaded storage container storage facility's banks of individual spaces.

The present invention more efficiently transfers containers between different types of container shipping systems, such as between container ships, rail cars, and over the road equipment. In such terminal and intermodal facilities, containers are frequently unloaded, such as from a container ship, rail car or truck, and placed into temporary storage prior to being loaded onto other transportation equipment. The other transportation equipment may be of the same type, such as a second ship or may be different.

This application describes two separate inventive features and a combination thereof for both storing containers more cost-effectively, and for moving those containers efficiently with a reduced cost.

The first feature of the invention is to store empty containers in a separate high rise empty storage (twelve or more containers high), container facility which is separated from but accessible to, the more expensive individual spaces in the loaded container storage facility. In the loaded container storage facility, each space in the facility is identified and a container is inserted into that space held separated from all other containers in the facility. In the empty container storage facility, however, the facility is arranged into vertical cells and identical containers of the same ocean carrier are stacked up to twelve or more containers high in these individual cells, one on top of the other. Access to a particular designated empty container in the stack other than the top container, is seldom ever required and thus, the last in or top container is the first out in almost all instances. One of the advantages of using stacking cells is that the operating cost of the facility is only approximately 25% as much as for containers in individual spaces. Furthermore, the cost to build an empty container storage facility, which does not need to accommodate the enormous weights of loaded containers, is 10%–20% of the cost to build the loaded container storage facility storing the same number of containers. The volume of space necessary for the empty container facility, is approximately 40% of that required to individually store the same number of containers in separated spaces or compartments in the much more expensive to build and operate banks of spaces found in the loaded container storage facility. Thus, this invention uniquely provides a separate yet integrated storage facility for the empty containers to reduce operating and construction costs of the overall storage and handling facility, and the land required, and does not unnecessarily burden or tie-up spaces in the stored container facility for the empty containers. Empty containers occasionally will be stored for a few hours, together with loaded containers, in the loaded container storage facility immediately prior to loading aboard ship.

A second feature of the invention is to provide fast transport balconies along the outside of the loaded storage container facility so that individual containers can be moved rapidly, bypassing the multiple slower moving cranes that move within their own zones, between the banks of spaces within the loaded container facility. These fast transport balconies make it possible to move containers from one zone, bypassing other zones, to another zone, or from one end of the loaded container storage facility to the other, in a fraction of the time, thus significantly reducing container time and handling costs.

Another feature of the invention is to incorporate and integrate together with the empty storage container facility a fast transport balcony for independently moving empty containers externally along the loaded storage facility to bypass the internal cranes' zones and thus speed-up delivery of empty containers to and from a ship. The empty container facility is linked to its fast transport balcony by cranes. These cranes also load and unload empty containers to or from trucks that drive beneath them.

DETAILED DESCRIPTION OF THE INVENTION

The container storage and handling equipment of this invention is designed to handle many containers per hour with the containers being in 20-foot lengths or up to 60 feet in length. The containers all have individual numbers. Or, they may be coded with conventional, automated equipment identification tags (AEI) and a computerized control system of a type well known in the art is provided to identify each container. The numbers or AEI identification tags are scanned as containers enter or leave the system. Through the system's computer, the system maintains a record of the location of every container in the system, so that it can send the necessary ASRS handling equipment to that stored location to either deliver or retrieve a container.

Figure 4:
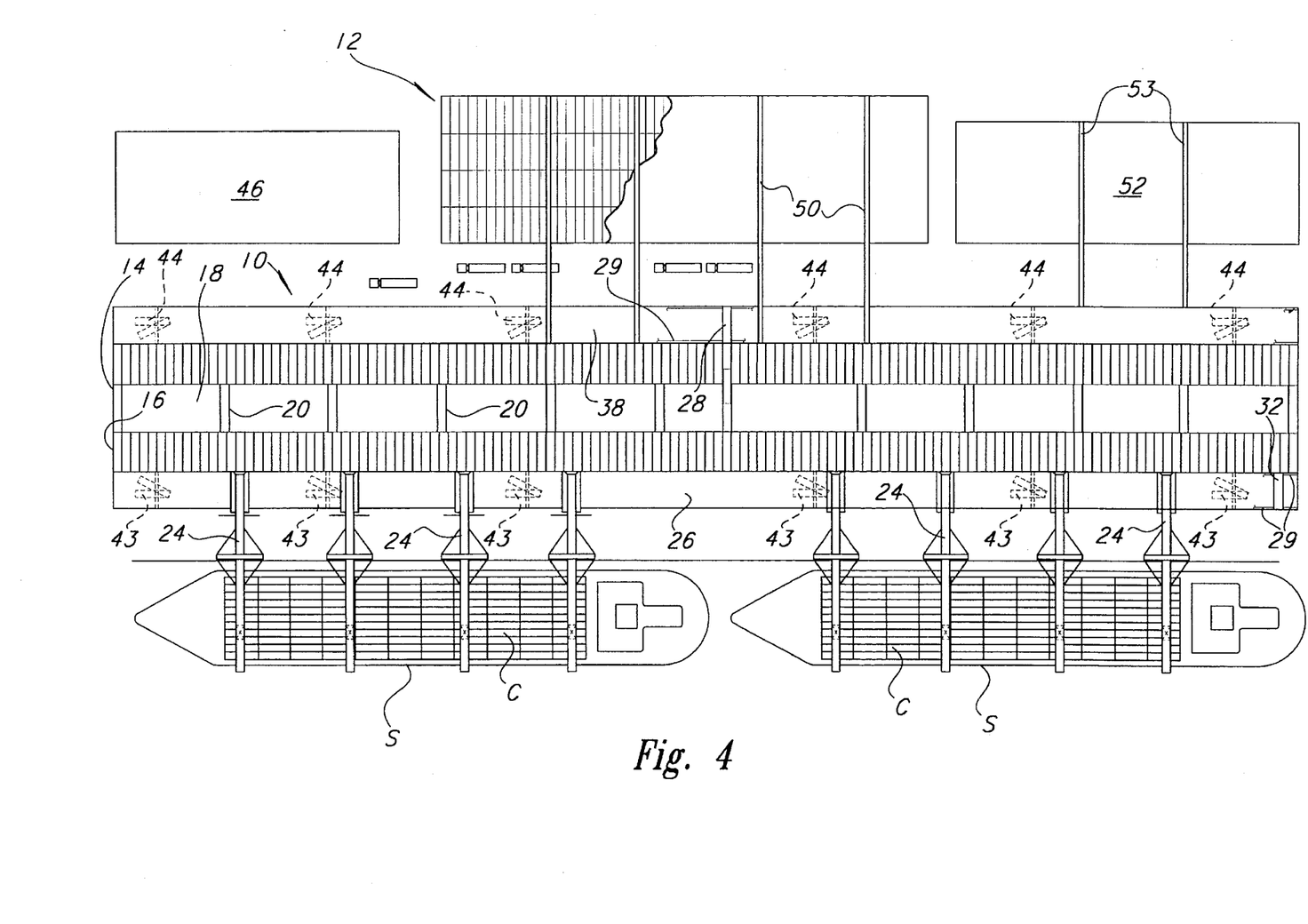
FIG. 4 is a diagrammatic plan view of the empty and loaded container, and chassis storage facilities and their loading and unloading cranes, and the control center, customs and equipment repair building.

As best shown in FIG. 4, the container storage facilities include a loaded container storage facility 10, an empty container storage facility 12, an upland bank of loaded storage spaces 14 and a pier bank of loaded storage spaces 16. Between the banks 14 and 16, is an internal bridge crane space 18 for a plurality of internal bridge cranes 20.

Figure 1:
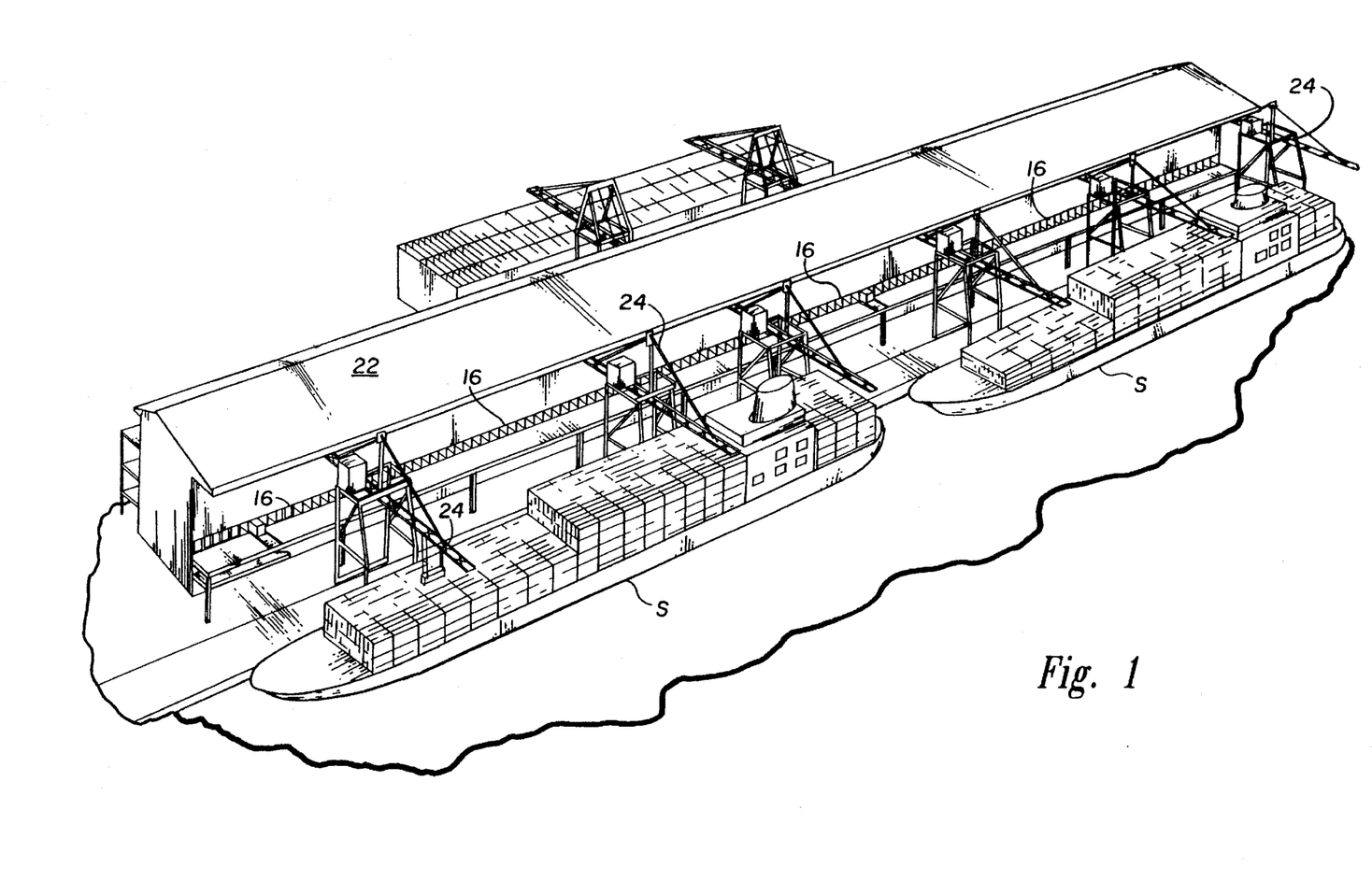
FIG. 1 is a perspective illustration of a typical container handling storage facility embodying the principles of the invention.
Figures 2, 2A:
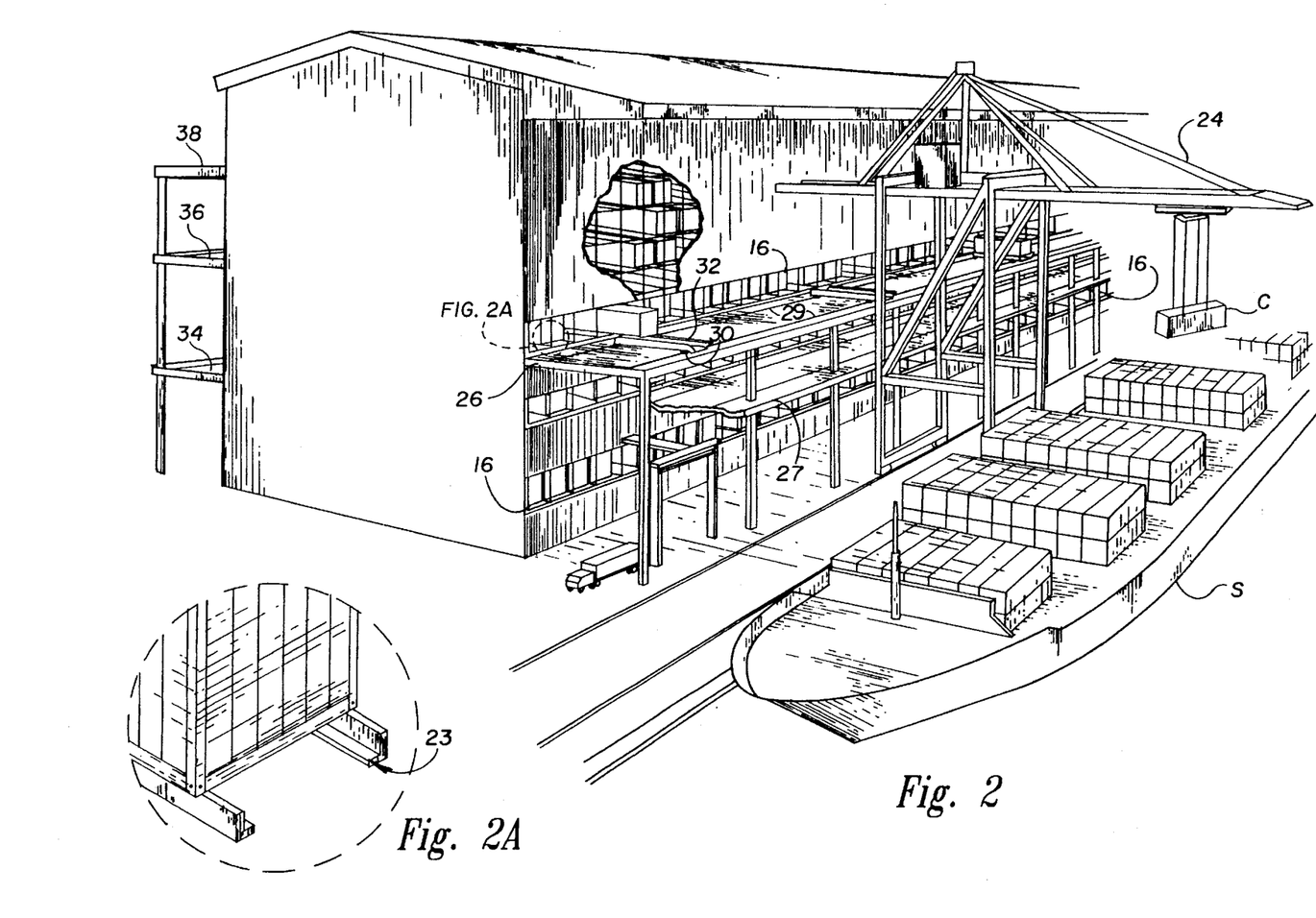
FIG. 2 is a schematic isometric showing a portion of the pier side of the facility.
FIG. 2A is a fragmentary detail of a portion of the facility shown in FIG. 2.

The entire loaded container storage facility will be a unitary structure, generally having a roof 22 covering grillwork or "rack" arrays of individually framed container storage spaces, such as shown in FIGS. 2 and 2A. The individually framed spaces independently support each container in a framework separated from all other containers as is well known in ASRS systems and further details are not necessary to an understanding of this aspect of the invention.

Figure 5:
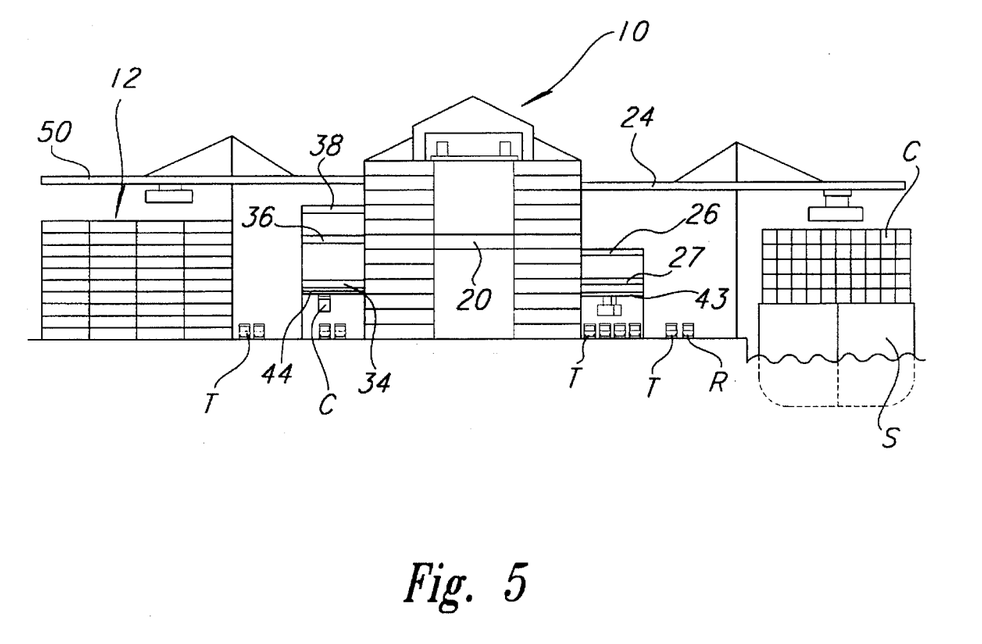
FIG. 5 is a diagrammatic end elevation of the storage facilities and their cranes and the fast transport and pier crane balconies.

Beginning with the pier bank 16, the ships "S" are off-loaded by conventional pier cranes 24 that have had their back reaches extended. The pier cranes can shift along the length of the ship and pick up a container "C," and either deposit the container on truck "T," rail car "R" beneath the cranes (FIG. 5), or after a 90° rotation, to a pier crane balcony 26 on the pier side of the pier bank. The designation "pier," "pier side," "upland," or "upland side" will be used throughout this description to identify structures on opposite sides of the loaded container storage facility. It should also be understood that this facility, however, can be used for handling storage, sorting, loading and unloading of containers for applications other than off-loading ships such as when the invention is used exclusively as an intermodal facility, transferring containers to or from rail cars and/or trucks.

As best shown in FIG. 2, the pier crane 24 picks up the container in a conventional manner, turns and delivers it to a transporter 28 that moves on its zones along the seventh level pier balcony 26. The zones of transporters on the pier crane balcony are adjusted manually or on the computer whenever the pier cranes are moved to other hatch positions on ships. The loaded container storage facility will have twelve or more spaces vertically and two hundred or more spaces along the length of each bank. Systems will be adapted for the number of ships to be simultaneously served and the number of containers to be stored, thus the number of levels and length will vary from port to port (200 along the length will serve two ships simultaneously). Thus, up to 10,000 containers, each up to 60 feet in length, can be stored in a typical facility. Loaded containers remain in the system only for a short period of time, while empty containers may remain in storage for a year or longer—thus, the separate storage facilities are mandatory for efficiency of operation and to reduce construction costs.

The transporter 28 is a remotely automated or computer controlled rail car that moves laterally on the pier crane balcony 26. It is of conventional construction having wheels 30 at each end of the transporter that run along tracks 29 on each balcony that extend from one end of the balcony to the other, that is between the left and right ends in the balcony shown in FIG. 2. Also, each transporter has a conventional ASRS inserting and retrieving mechanism 32, which will take the container "C" and in a manner well known in ASRS systems, move it into or out of a designated space. In the alternative, the transporter will retrieve a container from a space, and move it to a pier crane to be loaded aboard ship. There are two or more transporters for each pier crane which move in adjustable horizontal zones aligned with the position of the movable pier cranes. In addition to the pier crane balcony, there is a fifth level fast transport balcony 27 which carries two fast transporters. In the case of fast transport balconies 27, 34, 36 and 38 (referred to hereinafter), the transporters move laterally, bypassing the slower movements of the cranes between the banks within the loaded container facility. The fast transport balconies each have two transporters. When two ships are being served, both transporters are used, each moving within its zone. When one ship is being served, only one transporter on each fast transport balcony is used, so that it can move the full length of a balcony. The other fast transporters are then parked at the ends of the balconies.

One transporter on the pier crane balcony 26 can be receiving containers from the ship while another transporter is delivering a container from storage to the pier crane to place back on the ship. The pier cranes can thus double cycle, that is, they can remove a container from the ship with one inboard movement of the crane, deposit that container onto one of the transporters, then pick up a container from the second transporter, and on the return movement to the ship, bring that new container to be stowed aboard the ship. The additional transporter(s) can also function as a buffer between the handling rate of the pier cranes and that of the loaded container facility.

Higher speed transporters 28 operate on the fast transport balconies, but can deliver a container to any space along that level of the storage facility. If it is necessary to move the container from one end of the storage facility clear to the other end of the storage facility, for example, when two ships are being served and two transporters are operating, it will be necessary to move the transporter to an intermediate position along the length of the pier bank, place the container into a space, and have the second transporter on that fast transport balcony remove the container from that space and carry it further along to the desired space toward the other end of the balcony. If there is only one ship at the pier the first transporter, of course, can run the full length of the fast transport balcony to rapidly carry that container to the opposite end of the pier bank of spaces while the second transporter is parked at one end of the balcony.

Six conventional receive and deliver cranes 43 are also spaced along the length of the pier bank at the second level.

Preferably within the loaded container storage facility, the internal cranes 20 of which there are two for each pier crane, can transfer containers between any of the spaces within their zones of operation from one space in one bank to a different space in the same bank or to a different space in the parallel opposite bank as is common with ASRS systems. Since the internal cranes must move not only lengthwise of the storage facility but also move containers vertically, these cranes take a longer period of time to receive a container and reposition it into a different space than would a fast transporter. Thus, two of these cranes are needed for each pier crane. Each crane between the banks handles a zone of approximately twelve horizontally spaced columns of spaces and can retrieve a container from the inside of the space of a bank, move it to another location and insert the container into a space, either in the pier side bank or the upland side bank. ASRS bridge cranes of this type with rigid frameworks suspended from them, having both lateral and vertical movement capability, are well known in the art of ASRS systems, and details are not necessary for an understanding of the invention. Suffice it to say that since each of these internal cranes only operate in a limited zone of movement and take more time to move a container from one internal cranes' zones to the next between the banks of spaces, it is desirable to be able to bypass these internal cranes' zones for rapid movement of a container past several of the internal cranes' zones. Thus, it is apparent why the fast transport balcony 27 so advantageously is provided external of the internal crane space for moving a container past one or many of the independent zones within which the internal cranes operate.

Figure 3:
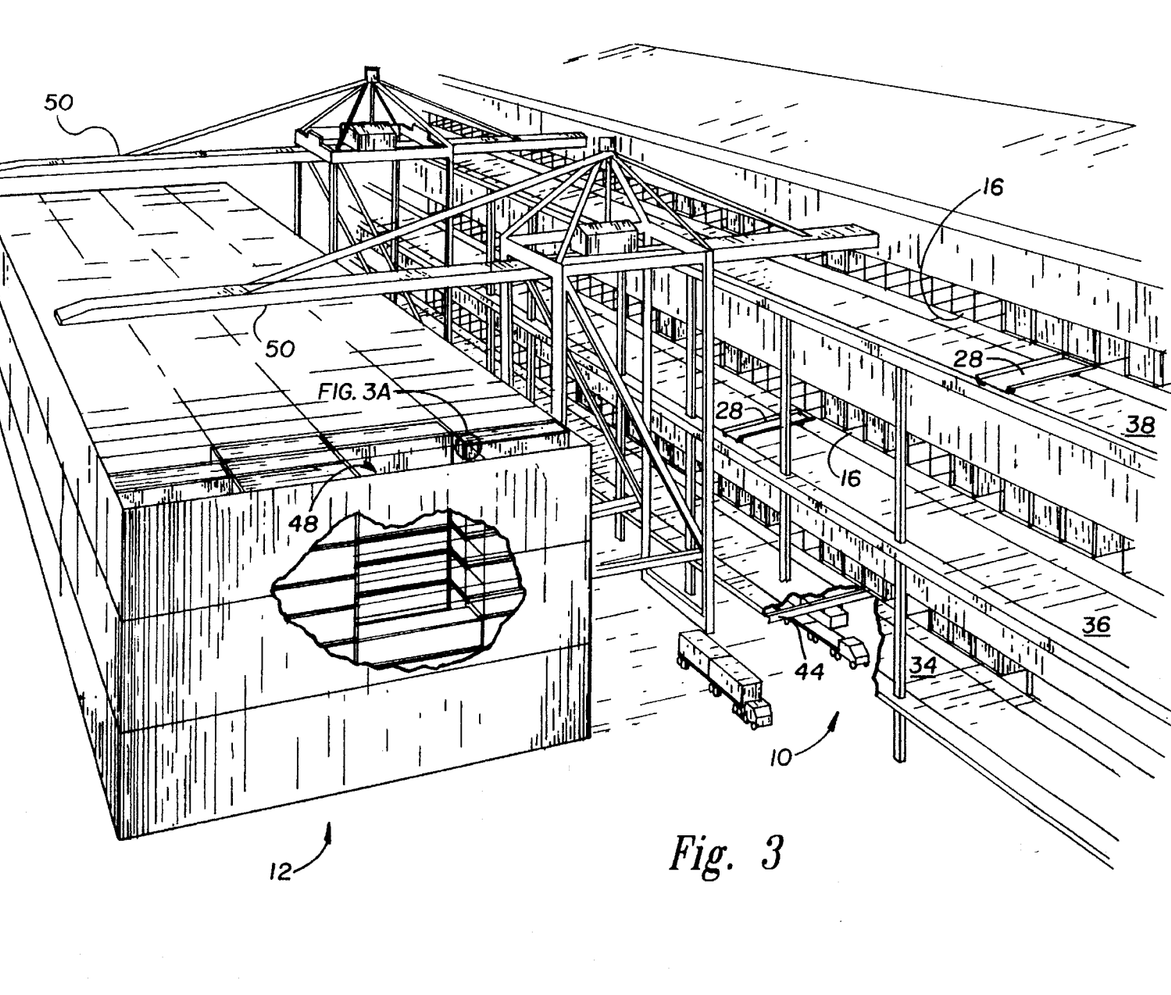
FIG. 3 is a fragmentary isometric showing the upland side of the facility and showing the empty container storage facility location embodying the principles of the invention.
Figure 3A:
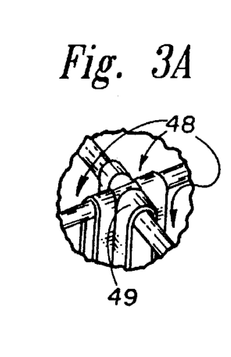
FIG. 3A is a fragmentary detail of a portion of the facility shown in FIG. 3.

As is best shown in FIG. 3, the upland bank 14 is provided with a fast transport balcony 34 at the sixth level of the bank and a fast transport balcony 36 at the eighth level. In addition, at the 10th level, there is a fast transport balcony 38 for handling empty containers.

The fast transport balconies 34 and 36 are each provided with two high speed transporters 28 in the same manner as the transport balcony 26 with its high speed transporters 28. Similarly, the fast transport balcony 38 for empty containers also has the same type of high speed transporter 28 as earlier described. It is desirable to place the empty container fast transport balcony and lower weight loaded containers, as high on the facility as possible, since the structural load carrying capability of the upper levels of the facility will require less steel if they handle only light weight loaded containers and empty containers, thus loading requirements and building strength requirements for this balcony and the upper levels of the structure, will not be as great as for the lower balconies and structures.

Upland receiving and delivering cranes 44, operate from the second level of the facility. Six receive and deliver cranes 44 are provided on the upland side of the loaded container facility. These cranes are conventional in construction and will deliver or remove containers at the second level spaces on the upland bank and either deposit them on rail cars or trucks or remove the containers from rail cars or trucks or other land based vehicles, and bring them into the loaded container facility for processing.

The system is provided with a centralized control center 46 of the type well known in the industry with ASRS systems. At this control center, operators may control the pier, empty container and receive and deliver cranes by remote controls while observing television monitors and other gauges. The internal cranes will be controlled by computer or, in emergencies, by remote controls, with television and distance gauge monitoring by the operators in the control center. In time, all of these cranes will be fully automated and computer controlled.

It is vital to the efficient functioning of the system to locate the empty container facility 12 midway along the length of and accessible to, the upland face of the loaded container facility 10. This facility differs from the loaded storage container facility 10 in that it is provided with a plurality of vertical cells 48 shown partially in the broken away drawing in FIG. 3. Empty containers of the same length and width of the same ocean carrier can be stacked up to fourteen or more high in individual cells as shown. The containers are guided by vertical corner posts 49 and rest one upon the other and are not in more expensive separated contained storage spaces or frameworks as in the loaded storage container facility. This reduces the overall land required, and the volume and the amount of steel necessary to construct this empty container storage facility, as well as the time and cost of handling empty containers. Since the containers in any one cell are all of the same size and from the same ocean carrier, there is, in normal operation, no need to have that each one be separately retrieved and removed. Rather, the last to be inserted can be the first to be removed. Individual cells will accommodate all of the containers of ocean carriers using a given machine. If carriers and container sizes change, the size of cells can be adjusted to accommodate them.

The containers for the empty storage facility or structure are handled by a plurality of empty storage container cranes 50 53 which can reach any of the cells and move a container to the cell or from the cell to the fast transport empty container balcony 38 or to trucks or rail cars beneath the cranes. As described earlier, the fast transport balcony advantageously is employed for handling empty containers and the entire 10th level fast transport balcony will be dedicated to empty containers. Some ships may have 50% or more of empty containers loaded onto the ship, so handling of empty containers is extremely important. Furthermore, an empty container as opposed to a container full of merchandise or perishable products can be stored for long periods of time, such as a year or more, without being needed. When it is desired to obtain an empty container or containers, the necessary number of containers is generally known hours before the ship arrives. These containers are then removed from their cells by the crane 50 and delivered to the fast transport balcony 38. There they are moved rapidly, bypassing the internal cranes to speed up the delivery of these empty containers. The empty containers can then be placed in loaded container facility just a few hours before having to be loaded aboard ships, close by the pier cranes that will load them aboard ship.

A typical operation of various types of containers will now be described. The pier cranes are capable of lifting a container from the ship, and placing it on a truck, or a rail car on the pier adjacent the pier bank of storage spaces. This is required for oversized containers, some flat racks, or containers with hazardous cargos.

Refrigerated containers will be removed from the ship by the pier crane and placed onto a transporter 28 on the balcony 26. The transporter then positions the container in one of the spaces, the internal bridge crane will remove the refrigerated container from that space and reposition it in one of the lower spaces at the first or second level. These levels will be provided with power cables, which will then will be manually plugged in to power the refrigeration equipment on the refrigerated containers, when necessary. (If containers will only be in the system for a few hours, it may not be necessary to connect them to power.)

A standard loaded container of any size, for example, identified with an identification number, or AEI identification, will be lifted by the pier crane, rotated 90° and deposited on a transporter 28. The transporter will then position the container within an empty space at that level. The internal crane 20 in that zone will then retrieve the container from that space and reposition the container lower, higher, or at some other lateral position for storage. If the container is going to be immediately placed on a rail car or truck (chassis), the internal crane will position the container into a space of an upland or seaward receive and deliver crane at the second level. The receive and deliver cranes will then place that container directly onto a rail car or chassis (trailer).

In the alternative, the loaded container can be removed from the ship, placed on a transporter 28, inserted into one of the spaces, then retrieved by the internal bridge crane and redeposited into a different space for a few hours or days of storage.

If it is necessary to move a container from one end of the pier bank to the space closer to the opposite end of the loaded container storage facility, or simply to a distant zone of an internal bridge crane, the pier crane will first deposit the container on a transporter 28. The transporter will insert the container into a space. An internal bridge crane will remove it, and then insert it into a space on the upland or seaward side (with its ASRS equipment), with access to a fast transport balcony. The high speed transporter on the fast transport balcony, will automatically retrieve the container and run up to the full length of the fast transport balcony 26 or if two ships are being served, and the second transporter is in operation, it will deposit the container in a space midway on the structure. The second high speed transporter will then retrieve the container at that space and move it rapidly along the balcony to the desired space. The fast transporter will then place the container into a space and the internal bridge crane will retrieve the container and reposition it in some other location in either the upland bank or the pier bank, or move it to a receive and deliver crane position.

Obviously, the opposite mode of operation, that is delivering from land vehicles to the ship is simply the reverse of the above procedure. A rail car, for example, delivers a loaded container to the receive and deliver crane 44, or 43, which picks up the container and rotates it 90° and moves it into a space on the second level of the upland or seaward bank. The internal bridge crane for that zone will then remove the container and move it to a seventh level space in the pier bank where a transporter can deliver it to the appropriate pier crane. If necessary, one of the fast transporters will be used to move the container to that desired pier crane position. Or, the system, with or without the use of fast transporters, will automatically move it to a storage space close to the pier crane that will later stow it aboard ship.

When needed, an empty chassis storage facility 52, can be provided for storing several empty chassis in individual spaces one above the other, up to eighteen deep by cranes 53. Initially, chassis will be stored in a conventional way on the same ground space.

While the preferred embodiments of the invention should have been illustrated and described, it should be understood that variations will be apparent to one skilled in the art. Accordingly, the invention should not be limited to the embodiments disclosed in the drawing.

I claim:

1. A container handling and storage apparatus at an ocean or land terminal servicing the loading and unloading of oceangoing containers to or from rail cars, trucks and/or ships, comprising:

a multi-level automated storage and retrieval loaded container storage facility having a plurality of individual framed vertically and horizontally separated spaces for storing loaded containers separated from one another in individual spaces;

means for delivering containers to and from said loaded container storage facility;

a separate empty container storage structure strategically located and separated from said loaded-container storage facility, said empty container storage structure having vertical cells for receiving and storing several identical empty containers of the same size and of the same ocean carrier, in stacked array directly one on top of another, in individual vertical cells so that the top container is always the next to be moved; and means for delivering empty containers between said strategically located empty container storage structure and the loaded container storage facility.

2. The apparatus of claim 1, said loaded container storage structure having said spaces in at least first and second elongated longitudinal vertical banks, said first bank having a pier side, said second bank having an upland side, and an internal bridge crane space there between, an ASRS (automated storage and retrieval system) container bridge crane between said first and second banks in said crane space, said empty container being movable from said empty container storage structure through said upland side of said second bank, hence through the internal bridge crane space to the first bank on the pier side immediately prior to being loaded aboard ship.

3. The apparatus of claim 2, including fast transport balconies on said upland side of said second bank, and a primary empty container fast transport balcony having at least one high speed container transporter for moving an empty container along said elongated second bank bypassing the internal container bridge cranes' zones in said internal crane space.

4. The apparatus of claim 2, said stacked empty container storage structure located midway along the length of said elongated longitudinal second bank for close reach to either end of said second (upland) bank.

5. The apparatus of claim 3, said fast transport balconies for loaded containers being located below said primary empty container fast transport balcony.

6. A method of storing and moving empty containers in a high-rise container storage, shipping and receiving installation including a high-rise loaded container storage facility having a pier bank and an upland bank of spaces for holding loaded containers separated from one another and having container access openings and an empty container storage structure located separated from said loaded container storage facility, comprising: positioning a plurality of identical empty containers of the same ocean carrier directly one on top of each other in vertical stacks in cells in said empty container storage structure at said location separated from the loaded container storage facility, and moving said empty containers from the vertical stacks to an ocean carrier through the loaded container storage facility.

7. The method of claim 6, further including immediately prior to being loaded aboard a ship, moving said empty containers to a loaded container storage facility space for temporarily holding the empty container.

8. The method of claim 6, wherein said loaded container storage facility upland and pier banks of container storage spaces are connected by an internal bridge crane area having internal bridge cranes therein each moving in a zone, said step of moving said empty containers including moving the empty containers along one bank past the container access openings externally past said internal bridge cranes' zones thereby bypassing the slower movement of said internal bridge cranes.

9. The method of claim 8, said loaded container storage facility having one or more horizontal fast transport container balconies upon which automated rail cars move at high speed conveying containers, said step of moving empty containers along said one bank including moving containers along such fast transport balconies, thus bypassing said slower internal bridge cranes, 10. The method of claim 8, said step of moving the empty containers including further moving the empty containers through a container storage space in said upland bank into said internal bridge crane area, hence through said internal bridge crane area to said pier bank, and hence through said pier bank.

11. A container handling and storage apparatus having automated rail car fast transport balconies, first and second spaced banks of container storage spaces, said storage spaces arranged in a plurality of vertically spaced horizontal rows, each said storage space having open opposite ends forming container access openings, said first bank of storage spaces having a seaward side and said second bank of storage spaces having an upland side, a bridge crane space between said banks of spaces, and a plurality of automated bridge cranes located in said bridge crane space, each said bridge crane being moveable in a zone of operation, a pier crane on the seaward side of said first bank of spaces, said storage spaces including a lower row of spaces and at least one elevated row of spaces above said lower row of spaces, said automated rail car fast transport balconies positioned along both the seaward side of said first bank and the upland side of said second bank and located at said elevated row of spaces, and a high speed transport means including automated rail cars on each said fast transport balcony for moving containers at a high speed horizontally past said access openings in at least one zone of operation to a space in another zone of operation to bypass at least one bridge crane in said space between said first and second banks.

12. The apparatus of claim 11, the pier crane being on a pier having a face along which the vessel is tied, each bank of container storage spaces having a horizontal length running parallel to the face of the pier, and having at least one said fast transport balcony externally of the entire horizontal length of the banks of storage spaces and having tracks thereon, and said automated rail cars movable along said tracks the entire length of said balcony.

13. The apparatus of claim 11, said balconies each having tracks, said transport means including automated wheeled cars which run in said tracks on said balconies.

14. A method of moving containers in a storage facility having two banks of container storage spaces, said storage spaces arranged in a plurality of vertically spaced horizontal rows, each space having ends with container access openings, fast transport balconies provided along the banks, a bridge crane space formed between opposing first sides of said banks, and at least two bridge cranes in said bridge crane space, each said bridge crane working in a distinct zone of container spaces, the banks each having a horizontal length and a vertical height, each fast transport balcony extending across a horizontal row of container access openings, the method comprising the steps of:
placing a container on one of said fast transport balconies, moving the container on said fast transport balcony externally of said bank of spaces past said outwardly facing container access openings of said container storage spaces along a second side of the bank opposite said first side, whereby the container is moved past the zone of operation of at least one of said bridge cranes to a space in another zone, hence bypassing at least one of the bridge cranes.

15. The method of claim 14, further including the steps of depositing a container in a container storage space after bypassing a bridge crane in said bridge crane space with a fast transport balcony, then moving the container with another bridge crane from one container storage space in one bank to a container storage space in the second bank.

* * * * *